US010135299B2

(12) United States Patent
Dwari et al.

(10) Patent No.: US 10,135,299 B2
(45) Date of Patent: Nov. 20, 2018

(54) ELEVATOR WIRELESS POWER TRANSFER SYSTEM

(71) Applicant: OTIS ELEVATOR COMPANY, Farmington, CT (US)

(72) Inventors: Suman Dwari, Vernon, CT (US); Dang V. Nguyen, South Windsor, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 58 days.

(21) Appl. No.: 15/244,362

(22) Filed: Aug. 23, 2016

(65) Prior Publication Data

US 2017/0057792 A1 Mar. 2, 2017

Related U.S. Application Data

(60) Provisional application No. 62/209,818, filed on Aug. 25, 2015.

(51) Int. Cl.
*H02J 50/12* (2016.01)
*B66B 11/04* (2006.01)
*B66B 9/00* (2006.01)

(52) U.S. Cl.
CPC .......... *H02J 50/12* (2016.02); *B66B 11/0407* (2013.01); *B66B 9/003* (2013.01)

(58) Field of Classification Search
CPC .............................. B66B 11/0407; H02J 50/12
See application file for complete search history.

(56) References Cited

U.S. PATENT DOCUMENTS

| 5,393,941 A | * | 2/1995 | Mizuno | B66B 1/34 187/293 |
| 6,301,128 B1 | | 10/2001 | Jang et al. | |
| 6,412,604 B1 | * | 7/2002 | Schuster | B66B 1/30 187/290 |

(Continued)

FOREIGN PATENT DOCUMENTS

| GB | 2518840 A | | 4/2015 |
| JP | 2006008394 A | * | 1/2006 |

(Continued)

OTHER PUBLICATIONS

Australian Search Report for Application No. 2016219623 dated Nov. 7, 2016.

*Primary Examiner* — Daniel Cavallari
(74) *Attorney, Agent, or Firm* — Cantor Colburn LLP

(57) ABSTRACT

An elevator system includes a car arranged to move along a hoistway and a wireless power transfer system that includes a secondary resonant coil mounted to the car and configured to induce an electro-motive force and output a voltage or current, and a plurality of primary resonant coils distributed along the hoistway and configured to transmit power to the secondary resonant coil when a primary resonant coil is adjacent to the secondary resonant coil and is selectively energized. A control system of the wireless power transfer system is configured to select and energize the plurality of primary resonant coils, and includes a plurality of switches with each one being associated with a respective one of the plurality of primary resonant coils. The plurality of switches are configured to selectively close to energize a selected one of the plurality of primary resonant coils associated with a location of the car.

15 Claims, 4 Drawing Sheets

(56) References Cited

U.S. PATENT DOCUMENTS

| | | | |
|---|---|---|---|
| 7,479,861 B2 | 1/2009 | Zepke et al. | |
| 7,728,551 B2 | 6/2010 | Reed et al. | |
| 8,123,003 B2 | 2/2012 | Meri et al. | |
| 8,531,059 B2 | 9/2013 | Ichikawa et al. | |
| 8,766,482 B2 | 7/2014 | Cook et al. | |
| 8,786,135 B2 | 7/2014 | Wang et al. | |
| 8,933,589 B2 | 1/2015 | Bourilkov et al. | |
| 2011/0169336 A1* | 7/2011 | Yerazunis | H02J 5/005 |
| | | | 307/104 |
| 2012/0200150 A1 | 8/2012 | Urano | |
| 2012/0200169 A1* | 8/2012 | Urano | H02J 5/005 |
| | | | 307/104 |
| 2012/0217817 A1 | 8/2012 | Wang et al. | |
| 2014/0091755 A1 | 4/2014 | Walley et al. | |
| 2014/0198544 A1* | 7/2014 | Tanaka | H02M 3/33538 |
| | | | 363/55 |
| 2014/0285030 A1 | 9/2014 | Nakamura et al. | |
| 2015/0054350 A1 | 2/2015 | Covic et al. | |
| 2015/0130407 A1 | 5/2015 | Ni et al. | |
| 2015/0314984 A1* | 11/2015 | McCarthy | H02J 5/005 |
| | | | 187/413 |
| 2016/0272071 A1* | 9/2016 | Taniguchi | H02J 50/40 |

FOREIGN PATENT DOCUMENTS

| | | | |
|---|---|---|---|
| JP | 2006137609 A | * | 6/2006 |
| WO | 2010112675 A2 | | 10/2010 |
| WO | 2014189492 A1 | | 11/2014 |

\* cited by examiner

ELEVATOR WIRELESS POWER TRANSFER SYSTEM

CROSS REFERENCE TO RELATED APPLICATION

This application claims priority to U.S. Provisional Patent Application No. 62/209,818, filed Aug. 25, 2015, the entire contents of which is incorporated herein by reference.

BACKGROUND

The present disclosure relates to elevator systems, and more particularly to wireless power transfer systems of the elevator system.

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway. Elevator cars typically need power for ventilation, lighting systems, control units, communication units and to recharge batteries installed, for example, on an elevator car controller. Existing systems use moving cables or current collectors/sliders to connect a moving elevator car with power lines distributed along the elevator hoistway.

SUMMARY

An elevator system according to one, non-limiting, embodiment of the present disclosure includes an elevator car disposed in and arranged to move along a hoistway extending in an axial direction; a secondary resonant coil mounted to the elevator car and configured to get induced an electro-motive force and output a voltage or current; a plurality of primary resonant coils distributed along the hoistway and configured to transmit power to the secondary resonant coil when a primary resonant coil of the plurality of resonant coils is adjacent to the secondary resonant coil and is selectively energized; and a control system configured to select and energize the plurality of primary resonant coils, the control system including a plurality of switches with each one of the plurality of switches being associated with a respective one of the plurality of primary resonant coils, and wherein the plurality of switches selectively close to energize a selected one of the plurality of primary resonant coils associated with a location of the elevator car.

Additionally to the foregoing embodiment, the control system includes a controller configured to control the plurality of switches for selective energization of the plurality of primary resonant coils based on a location of the elevator car.

In the alternative or additionally thereto, in the foregoing embodiment, the plurality of switches are smart switches.

In the alternative or additionally thereto, in the foregoing embodiment, the plurality of switches are configured to sequentially close upon at least one of a detected change in capacitance, inductance or impedance across a primary resonant coil of the plurality of primary resonant coils.

In the alternative or additionally thereto, in the foregoing embodiment, the plurality of switches each include a capacitance sensor, an inductance sensor, or an impedance sensor.

In the alternative or additionally thereto, in the foregoing embodiment, each one of the plurality of switches include an inductance sensor, and the plurality of switches are configured to sequentially close upon a detected change in inductance across a primary resonant coil of the plurality of primary resonant coils.

In the alternative or additionally thereto, in the foregoing embodiment, the control system includes a high frequency converter configured to power the plurality of primary resonant coils.

In the alternative or additionally thereto, in the foregoing embodiment, the high frequency converter outputs power within a range of about 1 kHz to 1 MHz.

In the alternative or additionally thereto, in the foregoing embodiment, the high frequency converter outputs power within a range of about 50 kHz to 500 kHz.

In the alternative or additionally thereto, in the foregoing embodiment the elevator system includes the power transmitted to the secondary resonant coil being a high frequency power; and a passive resonant component carried by the elevator car and configured to receive the high frequency power from the secondary resonant coil and store the power.

In the alternative or additionally thereto, in the foregoing embodiment the elevator system includes the power transmitted to the secondary resonant coil being a high frequency power; and a resonant component carried by the elevator car and configured to receive the high frequency power from the secondary resonant coil and mitigate effects of a varying coupling factor.

In the alternative or additionally thereto, in the foregoing embodiment the elevator system includes the power transmitted to the secondary resonant coil being a high frequency power; and a power converter carried by the elevator car and configured to convert the frequency of the high frequency power induced by the secondary resonant coil to a desired frequency of the load.

In the alternative or additionally thereto, in the foregoing embodiment, the power converter provides AC power to AC loads of the elevator car.

In the alternative or additionally thereto, in the foregoing embodiment the elevator system includes the power transmitted to the secondary resonant coil being a high frequency power; a power converter carried by the elevator car and configured to convert the high frequency power to a DC power; and an energy storage device carried by the elevator car and configured to receive and store the DC power from the power converter.

In the alternative or additionally thereto, in the foregoing embodiment the elevator system includes a DC elevator car load configured to receive the DC power from the energy storage device.

In the alternative or additionally thereto, in the foregoing embodiment the elevator system includes a plurality of permanent magnets carried by the elevator car, and wherein the plurality of primary resonant coils are configured to sequentially propel the elevator car in the hoistway when proximate to the plurality of permanent magnets.

A wireless power transfer system for inductively transferring power to an elevator car constructed to move in a hoistway according to another, non-limiting, embodiment with the wireless power transfer system including a secondary resonant coil mounted to the elevator car and configured to get induced an electro-motive force and output a current; a plurality of primary resonant coils distributed along the hoistway and configured to transmit power to the secondary resonant coil when a primary resonant coil of the plurality of resonant coils is proximate to the secondary resonant coil and is selectively energized; a power source configure to output a power; and a high frequency converter configured to convert the power to a high frequency power having a frequency with a range of 1 kHz to 1 MHz and outputting the high frequency power to the primary resonant coil.

Additionally to the foregoing embodiment, the wireless power transfer system includes a power converter carried by the elevator car and configured to reduce the frequency.

In the alternative or additionally thereto, in the foregoing embodiment, the wireless power transfer system includes a power converted carried by the elevator car and configured to convert a high frequency power induced by the secondary resonant coil to a DC power.

In the alternative or additionally thereto, in the foregoing embodiment, the wireless power transfer system includes a control system configured to select and energize the plurality of primary resonant coils, the control system including a plurality of switches with each one of the plurality of switches being associated with a respective one of the plurality of primary resonant coils, and wherein the plurality of switches selectively close to energize a selected one of the plurality of primary resonant coils associated with a location of the elevator car.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The following patent applications assigned to the same assignee and filed on the same day as the present disclosure are herein incorporated by reference in their entirety.

Figure 1:
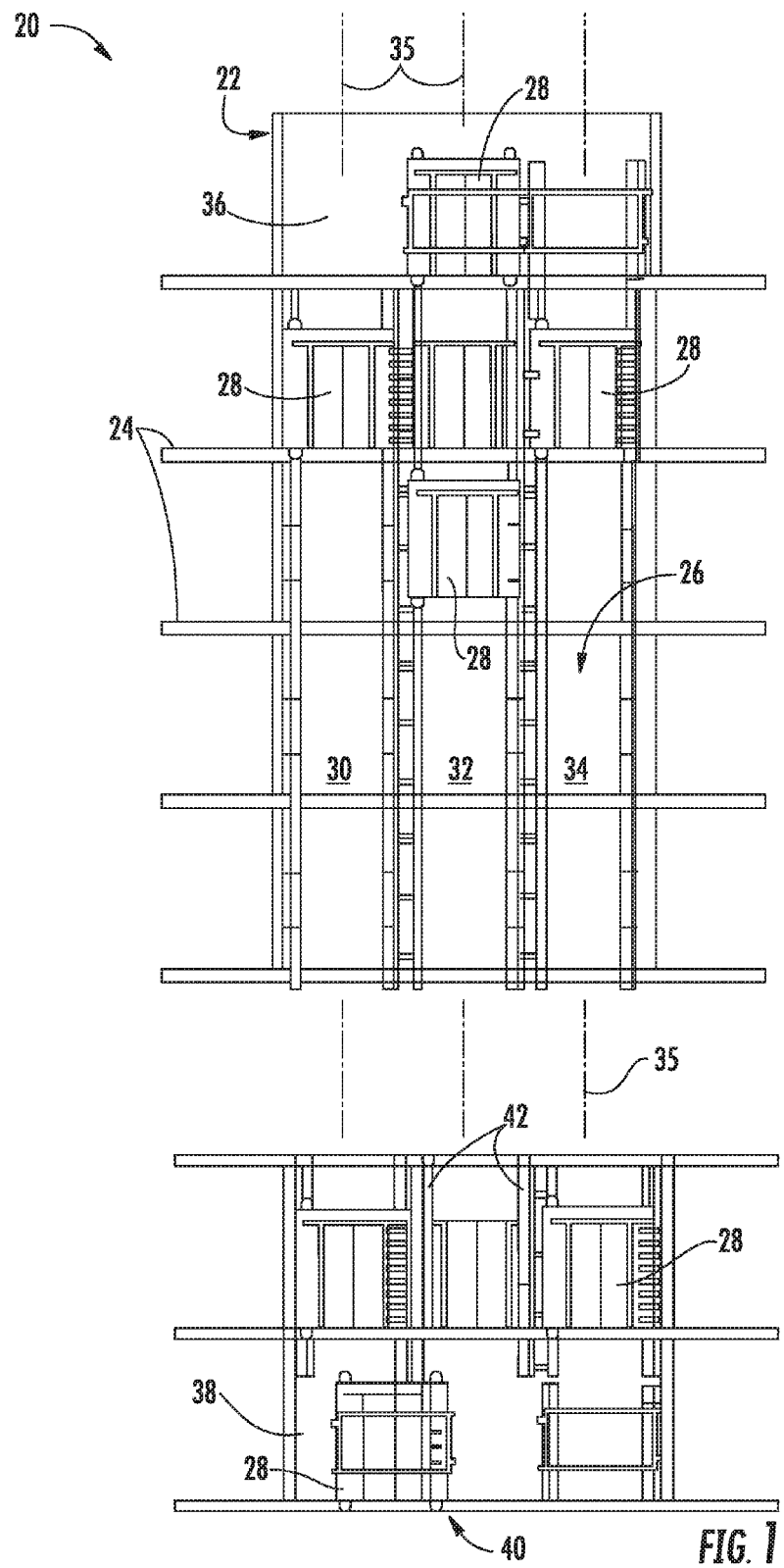
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 having boundaries defined by the structure 22 and at least one car 28 adapted to travel in the hoistway 26. The hoistway 26 may include, for example, three lanes 30, 32, 34 each extending along a respective central axis 35 with any number of cars 28 traveling in any one lane and in any number of travel directions (e.g., up and down). For example and as illustrated, the cars 28 in lanes 30, 34, may travel in an up direction and the cars 28 in lane 32 may travel in a down direction.

Above the top floor 24 may be an upper transfer station 36 that facilitates horizontal motion to elevator cars 28 for moving the cars between lanes 30, 32, 34. Below the first floor 24 may be a lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
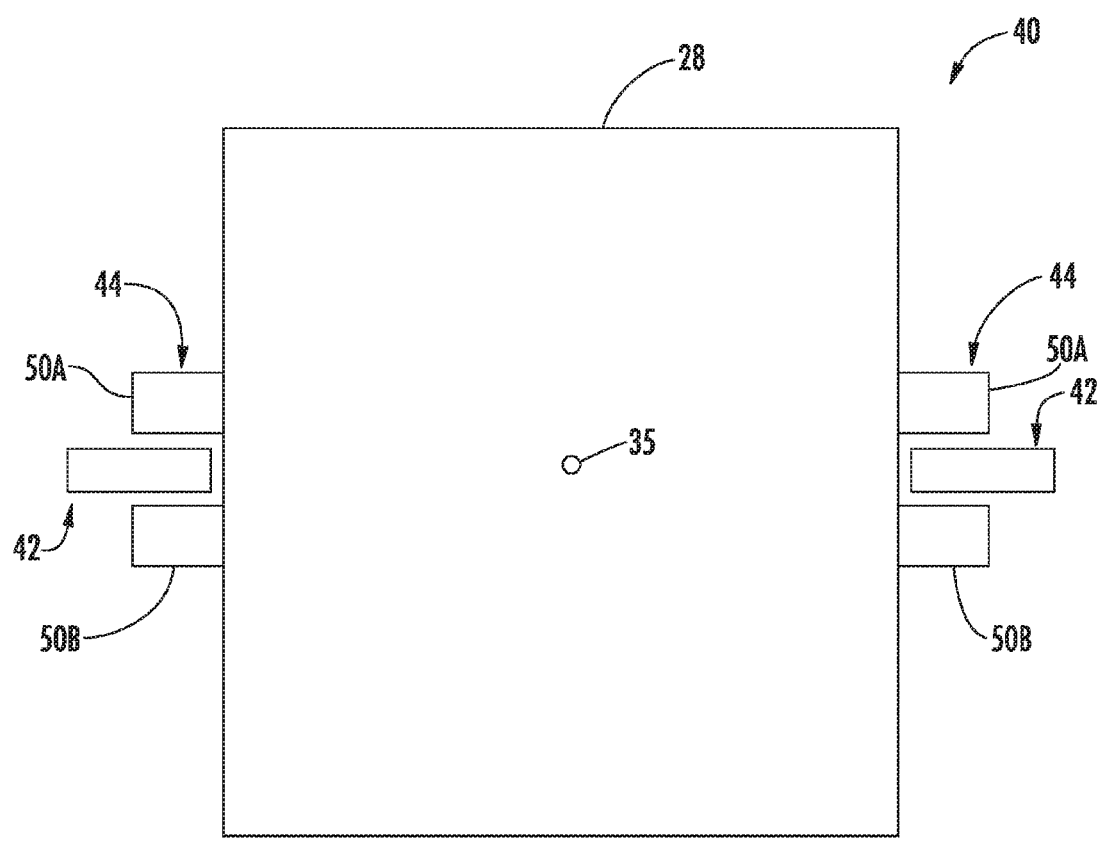
FIG. 2 is a top down view of a car and portions of a linear propulsion system in an exemplary embodiment.
Figure 3:
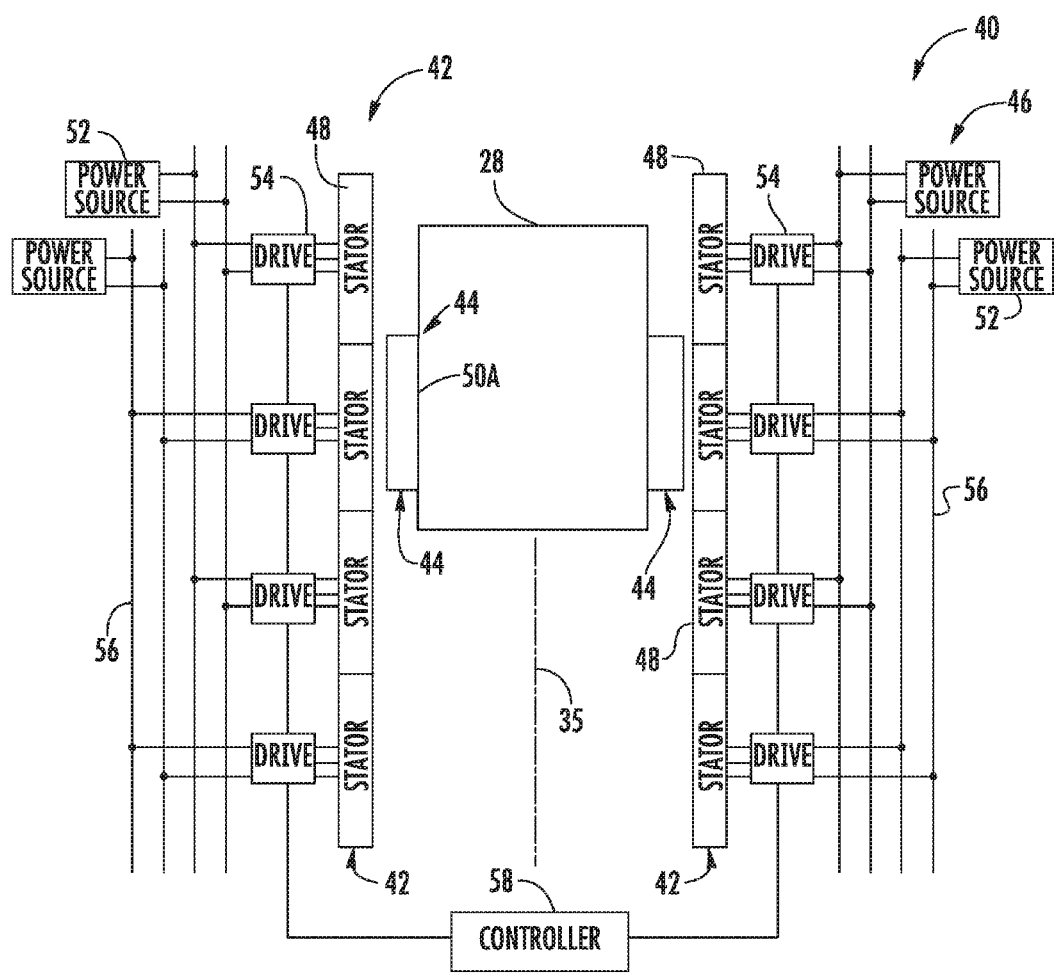
FIG. 3 is a schematic of the linear propulsion system.

Referring to FIGS. 1 through 3, cars 28 are propelled using a linear propulsion system 40 having at least one, fixed, primary portion 42 (e.g., two illustrated in FIG. 2 mounted on opposite sides of the car 28), moving secondary portions 44 (e.g., two illustrated in FIG. 2 mounted on opposite sides of the car 28), and a control system 46 (see FIG. 3). The primary portion 42 includes a plurality of windings or coils 48 mounted at one or both sides of the lanes 30, 32, 34 in the hoistway 26. Each secondary portion 44 includes two rows of opposing permanent magnets 50A, 50B mounted to the car 28. Primary portion 42 is supplied with drive signals from the control system 46 to generate a magnetic flux that imparts a force on the secondary portions 44 to control movement of the cars 28 in their respective lanes 30, 32, 34 (e.g., moving up, down, or holding still). The plurality of coils 48 of the primary portion 42 are generally located between and spaced from the opposing rows of permanent magnets 50A, 50B. It is contemplated and understood that any number of secondary portions 44 may be mounted to the car 28, and any number of primary portions 42 may be associated with the secondary portions 44 in any number of configurations.

Referring to FIG. 3, the control system 46 may include power sources 52, drives 54, buses 56 and a controller 58. The power sources 52 are electrically coupled to the drives 54 via the buses 56. In one non-limiting example, the power sources 52 may be direct current (DC) power sources. DC power sources 52 may be implemented using storage devices (e.g., batteries, capacitors), and may be active devices that condition power from another source (e.g., rectifiers). The drives 54 may receive DC power from the buses 56 and may provide drive signals to the primary portions 42 of the linear propulsion system 40. Each drive 54 may be a converter that converts DC power from bus 56 to a multiphase (e.g., three phase) drive signal provided to a respective section of the primary portions 42. The primary portion 42 is divided into a plurality of modules or sections, with each section associated with a respective drive 54.

The controller 58 provides control signals to each of the drives 54 to control generation of the drive signals. Controller 58 may use pulse width modulation (PWM) control signals to control generation of the drive signals by drives 54. Controller 58 may be implemented using a processor-based device programmed to generate the control signals. The controller 58 may also be part of an elevator control system or elevator management system. Elements of the control system 46 may be implemented in a single, integrated module, and/or be distributed along the hoistway 26.

Figure 4:
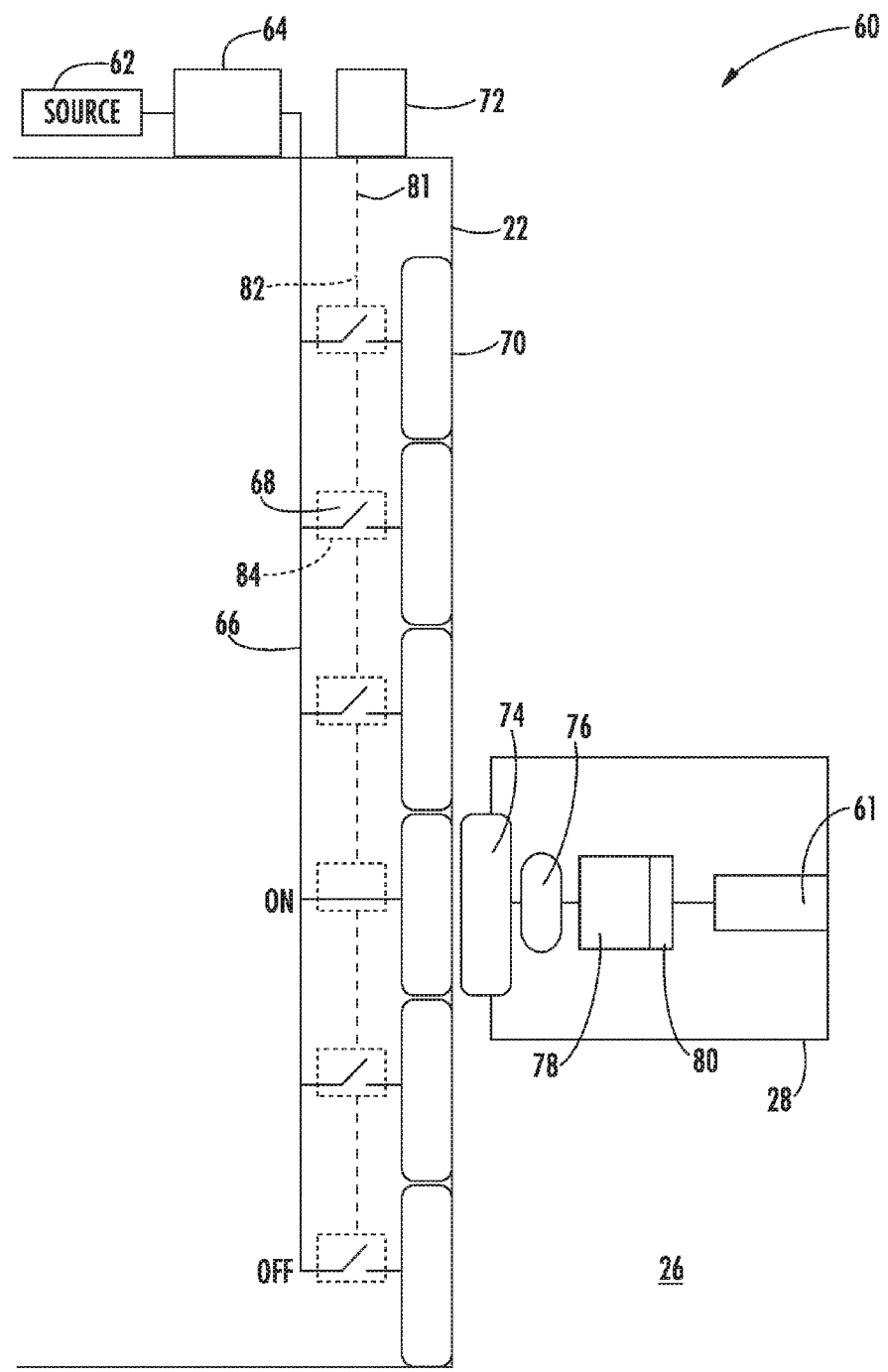
FIG. 4 is a schematic of a wireless power transfer system of the elevator system.

Referring to FIG. 4, a wireless power transfer system 60 of the elevator system 20 may be used to power loads 61 in or on the elevator car 28. The power transfer system 60 may be an integral part of the control system 46 thereby sharing various components such as the controller 58, buses 56, power source 52 and portions of the linear propulsion system 40 such as the primary portion 42 and other components. Alternatively, the wireless power transfer system 60 may generally be independent of the control system 46 and/or linear propulsion system 40. The power loads 61 may be alternating current (AC) loads; such as fans, which may be operating at a traditional low power frequency of, for example, about 60 Hz. Alternatively, or in addition thereto, the loads 61 may include direct current (DC) loads such as, for example, light emitting diode (LED) lights and displays.

The wireless power transfer system 60 may include a power source 62, a converter 64 that may be a high frequency converter, at least one conductor 66 for transferring power (e.g., high frequency power) from the converter 64, a plurality of switches 68, and a plurality of primary resonant coils 70 that may generally be the primary portion 42. Each one of the primary resonant coils 70 are associated with a respective one of the plurality of switches 68. The power transfer system 60 may further include a controller 72 that may be part of the controller 58. The controller 72 may be configured to selectively and sequentially place and/or maintain the switches 68 in an off position (i.e., circuit open) and/or in an on position (i.e., circuit closed). The power source 62 may be the power source 52 and may further be of a DC or of an AC type with any frequency (i.e. low or high).

The converter 64 may be configured to convert the power outputted by the power source 62 to a high frequency power for the controlled and sequential energization of the primary resonant coils 70 by transmitting the high frequency power through the conductors 66. More specifically, if the power source 62 is a DC power source, the converter 64 may convert the DC power to an AC power and at a prescribed high frequency. If the power source 62 is an AC power source with, for example, a low frequency such as 60 Hz, the converter 64 may increase the frequency to a desired high frequency value. For the present disclosure, a desired high frequency may fall within a range of about 1 kHz to 1 MHz. The high frequency of the wireless power transmission may be selected based upon the amount of power to be transferred, size of the primary and secondary coils and the gap across which the power is transferred. One example of a preferred range of the power transfer frequency may be about 50 kHz to 500 kHz.

The wireless power transfer system 60 may further include components generally in or carried by the elevator car 28. Such components may include a secondary resonant coil 74 configured to induce a current when an energized primary resonant coil 70 is proximate thereto, a resonant component 76 that may be active and/or passive, a power converter 78, and an energy storage device 80 that may be utilized to store power for the AC and/or DC loads 61. The secondary resonant coil 74 may get induced an electromotive force (EMF) or voltage when the coil is proximate to an energized primary resonant coil 74. The primary resonant coil 70 is energized when the respective switch 68 is closed based on the proximity of the elevator car 28 and secondary resonant coil 74.

Each switch 68 may be controlled by the controller 72 over pathways 82 that may be hard-wired or wireless. Alternatively, or some combination thereof, the switches 68 may be smart switches each including a sensor 84 that senses a parameter indicative of the proximity of the secondary resonant coil 74. For example, the sensor 84 may be an inductance sensor configured to sense a change of inductance across the associated primary resonant coil 70 indicative of a proximate location of the secondary resonant coil 74. Alternatively, the sensor 84 may be a capacitance sensor configured to sense a change of capacitance across the associated primary resonant coil 70 indicative of a proximate location of the secondary resonant coil 74. In another embodiment, the controller 72 may assume limited control and the switches 68 may still be smart switches. For example, the controller 72 may control the duration that a given switch remains closed; however, the switches are 'smart' in the sense that they may be configured to move to the closed or open position based on its local intelligence with or without the controller instruction to do so. It is further contemplated and understood the sensors 84 may alternatively be an inductance or impedance sensor.

The AC voltage induced across the secondary resonant coil 74 is generally at the high frequency of the primary resonant coil 70. The ability to energize the primary resonant coils 70 with the high frequency power (i.e., as oppose to low frequency) may optimize the efficiency of induced power transfer from the primary resonant coil 70 to the secondary resonant coil 74. Moreover, the high frequency power generally facilitates the reduction in size of many system components such as the coils 70, 74, the resonant component 76 and the converter 78 amongst others. Reducing the size of components improves packaging of the system and may reduce elevator car 28 weight. The international patent application WO 2014/189492 published under the Patent Cooperation Treaty on Nov. 27, 2014, filed on May 21, 2013, and assigned to Otis Elevator Company of Farmington, Conn., is herein incorporated by reference in its entirety.

The resonant component 76 may passive with fixed value, or, may be active with an actively controlled variable value. As a passive resonant component 76, the component is generally capacitive in nature and capable of operating with AC power. As an active resonant component 76, the component 76 is configured to mitigate the effects of a weak or variable coupling factor (i.e., varies when the secondary resonant coil 74 passes between primary resonant coils 70). That is, the resonant component 76 may be configured or operated in such a fashion that it may control the output current and voltage, and hence, the power from the secondary resonant coil 74.

The power converter 78 is configured to process power at a high frequency, received from the resonant component 76. The converter 78 may process the high frequency power to a desirable frequency power (e.g., low power frequency of about 60 Hz or other) that is compatible with AC loads 61 in the elevator car 28. The converter 78 may further function to convert the high frequency power to DC power, which is then stored in the energy storage device 80. An example of an energy storage device may be a type of battery.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator system, comprising:
   an elevator car disposed in and arranged to move along a hoistway extending in an axial direction;
   a secondary resonant coil mounted to the elevator car and configured to get induced an electro-motive force and output a voltage or current;
   a plurality of primary resonant coils distributed along the hoistway and configured to transmit power to the secondary resonant coil when a primary resonant coil of the plurality of resonant coils is adjacent to the secondary resonant coil and is selectively energized;

a control system configured to select and energize the plurality of primary resonant coils, the control system including a plurality of switches with each one of the plurality of switches being associated with a respective one of the plurality of primary resonant coils, and wherein the plurality of switches selectively close to energize a selected one of the plurality of primary resonant coils associated with a location of the elevator car; and a plurality of permanent magnets carried by the elevator car, and wherein the plurality of primary resonant coils are configured to sequentially propel the elevator car in the hoistway when proximate to the plurality of permanent magnets.

2. The elevator system set forth in claim 1, wherein the control system includes a controller configured to control the plurality of switches for selective energization of the plurality of primary resonant coils based on a location of the elevator car.

3. The elevator system set forth in claim 1, wherein the plurality of switches are smart switches configured to sequentially close upon at least one of a detected change in capacitance, inductance, or impedance across a primary resonant coil of the plurality of primary resonant coils, and the plurality of switches each include a capacitance sensor, an inductance sensor, or an impedance sensor.

4. The elevator system set forth in claim 1, wherein the control system includes a high frequency converter configured to power the plurality of primary resonant coils, and the high frequency converter outputs power within a range of about 1 kHz to 1 MHz.

5. The elevator system set forth in claim 4, wherein the high frequency converter outputs power within a range of about 50 kHz to 500 kHz.

6. The elevator system set forth in claim 1 further comprising:
the power transmitted to the secondary resonant coil being a high frequency power at a frequency of greater than 1 kHz; and
a passive resonant component carried by the elevator car and configured to receive the high frequency power from the secondary resonant coil and store the power.

7. The elevator system set forth in claim 1 further comprising:
the power transmitted to the secondary resonant coil being a high frequency power at a frequency of greater than 1 kHz; and
a resonant component carried by the elevator car and configured to receive the high frequency power from the secondary resonant coil and mitigate effects of a varying coupling factor.

8. The elevator system set forth in claim 1 further comprising:
the power transmitted to the secondary resonant coil being a high frequency power at a frequency of greater than 1 kHz; and
a power converter carried by the elevator car and configured to convert the frequency of the high frequency power induced by the secondary resonant coil to a desired frequency of the load.

9. The elevator system set forth in claim 8, wherein the power converter provides AC power to AC loads of the elevator car.

10. The elevator system set forth in claim 1 further comprising:
the power transmitted to the secondary resonant coil being a high frequency power at a frequency of greater than 1 kHz;
a power converter carried by the elevator car and configured to convert the high frequency power to a DC power; and
an energy storage device carried by the elevator car and configured to receive and store the DC power from the power converter.

11. The elevator system set forth in claim 10 further comprising:
a DC elevator car load configured to receive the DC power from the energy storage device.

12. A wireless power transfer system for inductively transferring power to an elevator car constructed to move in a hoistway, the wireless power transfer system comprising:
a secondary resonant coil mounted to the elevator car and configured to get induced an electro-motive force and output a current;
a plurality of primary resonant coils distributed along the hoistway and configured to transmit power to the secondary resonant coil when a primary resonant coil of the plurality of resonant coils is proximate to the secondary resonant coil and is selectively energized;
a power source configured to output a power; and
a high frequency converter configured to convert the power to a high frequency power having a frequency with a range of 1 kHz to 1 MHz and outputting the high frequency power to the primary resonant coil.

13. The wireless power transfer system set forth in claim 12 further comprising:
a power converter carried by the elevator car and configured to reduce the frequency.

14. The wireless power transfer system set forth in claim 12 further comprising:
a power converted carried by the elevator car and configured to convert a high frequency power induced by the secondary resonant coil to a DC power.

15. The wireless power transfer system set forth in claim 12 further comprising:
a control system configured to select and energize the plurality of primary resonant coils, the control system including a plurality of switches with each one of the plurality of switches being associated with a respective one of the plurality of primary resonant coils, and wherein the plurality of switches selectively close to energize a selected one of the plurality of primary resonant coils associated with a location of the elevator car.

* * * * *